US012206672B2

(12) United States Patent
Ejobe et al.

(10) Patent No.: US 12,206,672 B2
(45) Date of Patent: Jan. 21, 2025

(54) TECHNIQUES FOR CONTROLLING ACCESS TO SEGMENTED DATA

(71) Applicant: NAGRAVISION S.A., Cheseaux-sur-Lausanne (CH)

(72) Inventors: Rhose Ejobe, Thonon-les-Bains (FR); Frederic Thabaret-Diebold, Thonon-les-Bains (FR); Cristian Ruiz, Bussigny (CH); Romain Aviolat, Bioley-Magnoux (CH); Riccardo Succa, Ecublens (CH)

(73) Assignee: NAGRAVISION SÀRL, Cheseaux-sur-Lausanne (CH)

( * ) Notice: Subject to any disclaimer, the term of this patent is extended or adjusted under 35 U.S.C. 154(b) by 253 days.

(21) Appl. No.: 17/790,431

(22) PCT Filed: Nov. 30, 2020

(86) PCT No.: PCT/IB2020/001076
§ 371 (c)(1),
(2) Date: Jun. 30, 2022

(87) PCT Pub. No.: WO2021/136963
PCT Pub. Date: Jul. 8, 2021

(65) Prior Publication Data
US 2023/0088566 A1 Mar. 23, 2023

Related U.S. Application Data

(60) Provisional application No. 62/955,815, filed on Dec. 31, 2019.

(51) Int. Cl.
*H04L 9/40* (2022.01)

(52) U.S. Cl.
CPC .................................. *H04L 63/101* (2013.01)

(58) Field of Classification Search
CPC .......................... H04L 63/101; H04L 63/104
See application file for complete search history.

(56) References Cited

U.S. PATENT DOCUMENTS

2005/0044426 A1   2/2005  Vogel et al.
2007/0174362 A1*  7/2007  Pham .................. G06F 21/6209
(Continued)

FOREIGN PATENT DOCUMENTS

WO   WO 2005/017723 A1   2/2005
WO   WO 2010/057173 A2   5/2010

OTHER PUBLICATIONS

International Search Report and Written Opinion issued Apr. 6, 2021 in PCT/IB2020/001076 filed Nov. 30, 2020, 12 pages.
(Continued)

*Primary Examiner* — Kristie D Shingles
(74) *Attorney, Agent, or Firm* — Oblon, McClelland, Maier & Neustadt, L.L.P.

(57) ABSTRACT

Techniques for controlling access to segmented data of a plurality of users that is requested by at least one data consumer device. In response to conditions specified in communications between at least one data aggregator system and the at least one data consumer device, information of a number of users meeting specified search criteria are shared (e.g., for a limited time). Use of the data in violation of the specified conditions may trigger penalties under a smart contract on a distributed ledger or blockchain.

20 Claims, 16 Drawing Sheets

(56) References Cited

U.S. PATENT DOCUMENTS

2021/0182423 A1* 6/2021 Padmanabhan ....... H04L 9/3271
2022/0050921 A1* 2/2022 LaFever ................ H04L 63/20

OTHER PUBLICATIONS

Indian Office Action issued Feb. 19, 2024, in Indian Patent Application No. 202217041274 (with English Translation), 6 pages.

\* cited by examiner

```xml
<user>
    <demographicinformation>
        <name>User1</name>
        <birthdate>1-1-1990</birthdate>
        <height>72 inches</height>
        <eyecolor> Blue</eyecolor>
    </demographicinformation>
    <identifyinginformation>
        <US-SSN>xxx-yyy-zzzz</US-SSN>
        <CA-DLN>CA999-999-999</CA-DLN>
        <name>User1</name>
    </identifyinginformation>
    <financialinformation>
        <income>$50,000</income>
    </financialinformation>
</user>
```

Figure 2

```
<users>
    <user userid="1234">
        <demographicinformation condition="c1">
            <name>User1</name>
            <age "as-of"="2019-1-1">25</age>
            <birthdate nevershare="true">1-1-1990</birthdate>
            <height>72 inches</height>
            <eyecolor> Blue</eyecolor>
        </demographicinformation>
        <identifyinginformation condition="c1">
            <name>User1</name>
        </identifyinginformation>
        <financialinformation condition="c1">
            <income>$50,000</income>
        </financialinformation>
        <socialmedia>
            <publicmedia>URL1</publicmedia>
        </socialmedia>
        <healthinformation/>
        <purchasinginformation/>
        </usageinformation>
    </user>
    <user>
        <demographicinformation condition="c1">
            <name>User2</name>
            ...
        </demographicinformation>
        ...
    </user>
    <user>
        <demographicinformation condition="c1">
            <name>User3</name>
            ...
        </demographicinformation>
        ...
    </user>
</users>
```

Figure 3

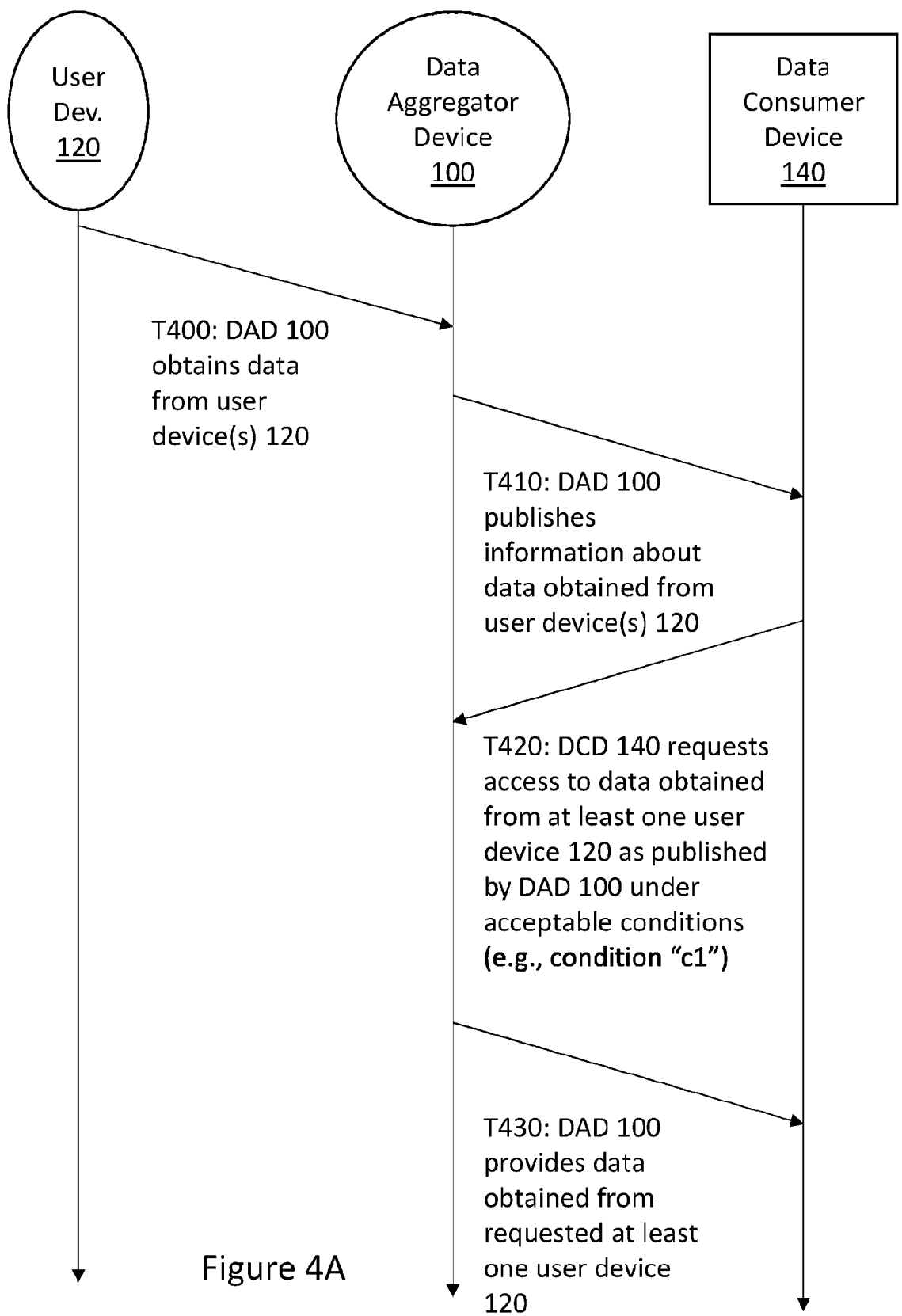

```
<usagerecord dataconsumer="DC123" userid="1234" expires="2020-01-01" >
    <demographicinformation condition="c1">
        <age "as-of"="2019-1-1">25</age>
        <eyecolor> Blue</eyecolor>
    </demographicinformation>
    <financialinformation condition="c1">
        <income>$50,000</income>
    </financialinformation>
</usagerecord >
```

Figure 5

```xml
<users>
    <user userid="1234">
        <demographicinformation condition="c1">
            <name>User1</name>
            <age "as-of"="2019-1-1">25</age>
            <birthdate nevershare="true">1-1-1990</birthdate>
            <height>72 inches</height>
            <eyecolor> Blue</eyecolor>
        </demographicinformation>
        <identifyinginformation condition="c1">
            <name>User1</name>
        </identifyinginformation>
        <financialinformation condition="c1">
            <income>$50,000</income>
        </financialinformation>
        <socialmedia>
            <publicmedia>URL1</publicmedia>
        </socialmedia>
        <healthinformation/>
        <purchasinginformation/>
        <usagerecords>
            <usagerecord dataconsumer="DC123" expires="2020-01-01">
                <demographicinformation condition="c1">
                    <age "as-of"="2019-1-1">25</age>
                    <eyecolor> Blue</eyecolor>
                </demographicinformation>
                <financialinformation condition="c1">
                    <income>$50,000</income>
                </financialinformation>
            </usagerecord >
        <usagerecords>
    </user>
    ...
</users>
```

Figure 6

```xml
<users>
    <user userid="1234">
        <demographicinformation condition="c1">
            <name>User1</name>
            <age "as-of"="2019-1-1">25</age>
            <birthdate nevershare="true">1-1-1990</birthdate>
            <height>72 inches</height>
            <eyecolor>Blue</eyecolor>
        </demographicinformation>
        <identifyinginformation condition="c1">
            <name>User1</name>
        </identifyinginformation>
        <financialinformation condition="c1">
            <income>$50,000</income>
        </financialinformation>
        <socialmedia>
            <publicmedia>URL1</publicmedia>
        </socialmedia>
        <educationinformation>
            <postHSEducation>4+</postHSEducation>
        </educationinformation>
        </healthinformation>
        </purchasinginformation>
        <usagerecords>
            ...
            <usagerecord dataconsumer="DC123" expires="2020-02-01" condition="c1">
                <educationinformation>
                    <postHSEducation>4+</postHSEducation>
                </educationinformation>
            </usagerecord >
        </usagerecords>
    </user>
    ...
</users>
```

Figure 7

```xml
<users>
    <user userid="1234" >
        <demographicinformation condition="c1">
            <name>User1</name>
            <age "as-of"="2019-1-1">25</age>
            <birthdate nevershare="true">1-1-1990</birthdate>
            <height>72 inches</height>
            <eyecolor>Blue</eyecolor>
        </demographicinformation>
        <demographicinformation condition="c2">
            <name>User1</name>
            <age "as-of"="2019-1-1">25</age>
            <birthdate nevershare="true">1-1-1990</birthdate>
            <height>72 inches</height>
            <hairColor>RedHead</hairColor>
            <eyecolor> Blue</eyecolor>
        </demographicinformation>
        <identifyinginformation condition="c1">
            <name>User1</name>
        </identifyinginformation>
        <financialinformation condition="c1">
            <income>$50,000</income>
        </financialinformation>
        <socialmedia>
            <publicmedia>URL1</publicmedia>
        </socialmedia>
        <educationinformation>
            <postHSEducation>4+</postHSEducation>
        </educationinformation>
        </healthinformation>
        </purchasinginformation>
        <usagerecords>
            ...
            <usagerecord dataconsumer="DC123" expires="2019-12-01">
                <demographicinformation condition="c2">
                    <hairColor>RedHead</hairColor>
            </usagerecord >
            ...
        </usagerecords>
    </user>
    ...
</users>
```

Figure 8

```xml
<users>
    <user>
        <demographicinformation condition="c1" key="k1">
            <name>aOdskw</name>
            <age "as-of"="2019-1-1">jkjbdsk</age>
            <birthdate nevershare="true">lkhfdvl</birthdate>
            <height>72 inches</height>
            <eyecolor>fo3fiq</eyecolor>
        </demographicinformation>
        <demographicinformation condition="c2" key="k2">
            <name>jv98dkjcu</name>
            <age "as-of"="2019-1-1">kcd0972nx</age>
            <birthdate nevershare="true">lcs0emc</birthdate>
            <height>m.shjsjy</height>
            <hairColor>j^jcsl3</hairColor>
            <eyecolor> kd01,dchec</eyecolor>
        </demographicinformation>
        <identifyinginformation userid="1234" condition="c1" key="k1">
            <name> aOdskw </name>
        </identifyinginformation>
        <financialinformation condition="c1" key="k1">
            <income>cag7#$</income>
        </financialinformation>
        <educationinformation>
            <postHSEducation>4+</postHSEducation>
        </educationinformation>
        <healthinformation key="k3">
            <skincancergene>8&hdkw</skincancergene>
        </healthinformation>
        </purchasinginformation key="k4">
        <usagerecords>
            ...
        </usagerecords>
    </user>
    <user>
        <demographicinformation condition="c1" key="k999">
            <name>d3htf57</name>
            ...
        </demographicinformation>
        ...
    </user>

...
</users>
```

Figure 9

```
<smartcontract>
    <conditions>
        <validuntilatleast>2020-01-01</validuntilatleast>
        <obtained_data> demographicinformation:age,
demographicinformation:eyecolor, financialinformation:income
        </obtained_data>
    </conditions>
    <misuse conditions>
        <payment onetimefee="true">$5000</payment>
        <payor_account>BankRouting# corresponding to payor account in
smart contract</payor_account>
        <payee_account>BankRouting# corresponding to data aggregator
account in smart contract</payee_account>
    </misuse conditions>
    <contract_code>
        code identifying one-time payment and payor and payee accounts
    </contract_code>
</smartcontract>
```

Figure 10

```xml
<smartcontract>
      <conditions conditionset=1>
            <validuntilatleast>2020-01-01</validuntilatleast>
      <obtained_data> demographicinformation:age, demographicinformation:eyecolor, financialinformation:income
      </obtained_data>
      </conditions>
      <misuse conditions>
            <payment onetimefee="true">$10000</payment>
            <payor_account>BankRouting# corresponding to payor account in smart contract</payor_account>
            <payee_account>BankRouting# corresponding to user device account or data aggregator devce in smart contract</payee_account>
      </misuse conditions>
      <contract_code>
            code identifying one-time payment and payor and payee accounts
      </contract_code>

<conditions conditionset=2>
            <validuntilatleast>2020-06-01</validuntilatleast>
      <obtained_data> demographicinformation:age, demographicinformation:eyecolor, financialinformation:income
      </obtained_data>
      </conditions>
      <misuse conditions>
            <payment onetimefee="false" repeatperiod="monthly" periods=12>$2000</payment>
            <payor_account>BankRouting# corresponding to payor account in smart contract</payor_account>
            <payee_account>BankRouting# corresponding to user device account or data aggregator devce in smart contract</payee_account>
      </misuse conditions>
      <contract_code>
            code identifying one-time payment and payor and payee accounts
      </contract_code>
</smartcontract>
```

Figure 11

TECHNIQUES FOR CONTROLLING ACCESS TO SEGMENTED DATA

FIELD OF THE DISCLOSURE

The present disclosure is directed to techniques for controlling access to segmented data, and in at least one embodiment to techniques for segmenting data into separately encrypted groups of data and controlling access thereto to control appropriate uses thereof and to manage inappropriate uses thereof.

SUMMARY

The sharing of computer-oriented data is increasingly prevalent via wide area networks (e.g., the Internet). User data, such as demographic data, has value in determining how to customize a user's experience when the user interacts with a computer application (sometimes implemented and referred to as an "app") or website. However, once a user shares its data (including, but not limited to, personal data, demographic data, personally identifiable information (PII) and/or any other valuable user data) beyond its own user device, and especially if it shares its data across multiple computer systems, the data is traditionally out of the user's control as to how long the data can be used, what the data can be used for, and whether the data can be redistributed.

According to at least one aspect of a system described herein, data of a user is segmented into plural groups so that access to the data of each group can be separately controlled, and a user can be separately incentivized to provide access to each group.

BRIEF DESCRIPTION OF THE DRAWINGS

The following description, given with respect to the attached drawings, may be better understood with reference to the non-limiting examples of the drawings, wherein:

FIG. 2 is an exemplary typed data block representing an exemplary set of data that is initially obtained by a data aggregator system for a user "User1";

FIG. 3 is an exemplary typed data block representing an exemplary set of data that is initially internally stored by a data aggregator system for the user "User1" of FIG. 2;

FIG. 4A is a data exchange diagram showing at least one data aggregator system obtaining data from at least one user device, publishing the availability of at least a portion of the obtained data, and a data consumer device requesting and being provided access to a requested portion of the available data;

FIG. 5 is an exemplary typed data block representing an exemplary set of data that was shared with a data consumer device under a set of conditions "c1";

FIG. 6 is an exemplary typed data block representing the exemplary set of data of FIG. 3 that has been supplemented to include a usage record corresponding to how the portion of the data in FIG. 5 was shared with a data consumer device under a set of conditions "c1";

FIG. 7 is an exemplary typed data block representing the exemplary set of data of FIG. 6 that has been supplemented without user intervention to include additional information in response to a query from a data consumer device;

FIG. 8 is an exemplary typed data block representing the exemplary set of data of FIG. 7 that has been supplemented to include an additional set of conditions "c2" for utilizing a number of the data elements therein;

FIG. 9 is an exemplary typed data block representing the exemplary set of data of FIG. 8 where various groups of data elements have been encrypted with different keys;

FIG. 10 is a portion of an exemplary request from a data consumer device including a description of the smart contract conditions that are being proposed by the data consumer device on use and a penalty for misuse of user data; and FIG. 11 is a portion of an exemplary response from a user device or a user device proxy including a description of the smart contract use conditions that are being counterproposed by the user device or user device proxy and a penalty for misuse of user data.

DETAILED DESCRIPTION

In order to address the technical problem of restricting access to shared data, a data aggregator system acts as a gatekeeper between at least one user device of at least one user and at least one data consumer device that utilizes (and potentially redistributes) the shared data obtained from the at least one user device (through the data aggregator system). The shared data is initially obtained by the data aggregator system from the at least one user device. When a data consumer device initially queries the data aggregator system to determine if the data aggregator system has shared data meeting specified conditions and/or having specified attributes, the data aggregator system can inform the data consumer device whether it has initially matching data, and, if so, how many records of such initially matching data it has. The data consumer device may later query the data aggregator system to obtain addition data (e.g., other characteristics and/or attributes of users) corresponding to a subset of the initially matching data. If the data consumer device requests and is provided with any of the shared data from the at least one user device via the data aggregator system, a (non-repudiatable) record of the conditions under which the data was provided is created to track data misuse. By establishing a combined set of records on data misuse, the data aggregator can, for example using statistical analysis, identify the data consumer device that improperly utilized and/or redistributed the data to assess at least one penalty against the identified data consumer device 140. For example, by correlating an alleged breach of use of one or more sets of data under the executed smart contract with other reported alleged breaches of other sets of data of other users, the data aggregator system can determine, in response to the correlating, that the data consumer device is a participant in at least one of a threshold number and/or a threshold percentage of smart contracts for which there is an alleged breach of use—thereby triggering a penalty.

Figure 1A:
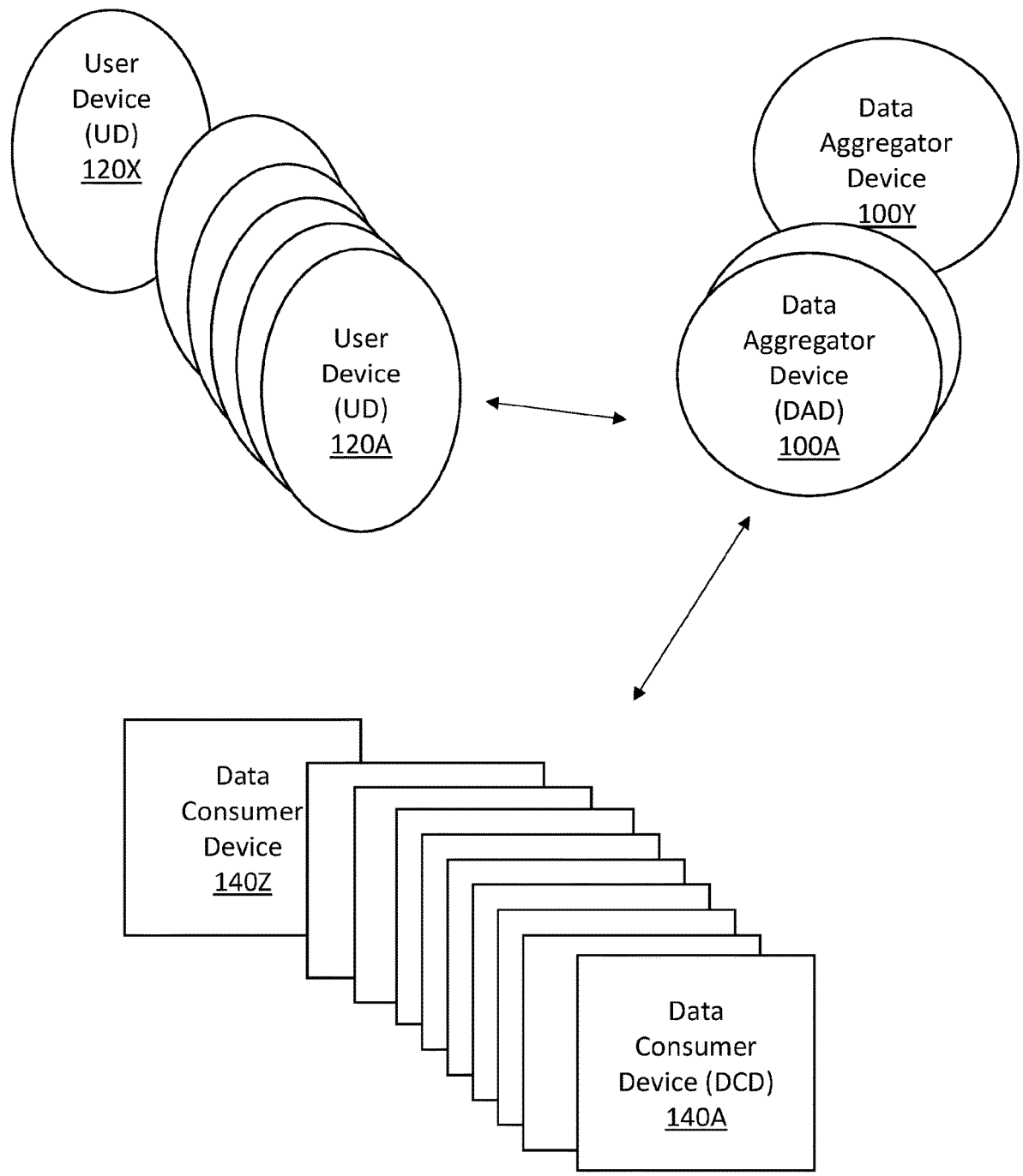
FIG. 1A is a block diagram of a set of user devices sharing data with at least one data aggregator system which separately controls access to segmented portions of the user data by data consumer devices.

As shown in the block diagram of FIG. 1A, at least one data aggregator system 100A—100Y obtains data (in one or more transfers) from a single user device 120A of a user or from a plurality of user devices 120A—120X (where the user devices can be running one or more programs, applications, "apps" or interpreted environments, including but not limited to a web-based environment and/or a virtual environment) corresponding to respective users (where X and Y may be the same but generally will be different with a single data aggregator system operating to aggregate for at least many orders of magnitude more user devices than there are aggregator devices (e.g., with each aggregator device aggregating data for millions or at least hundreds of thousands of user devices)). As used herein, each user device 120 is represented by an oval, and more than one of the plurality of user devices may also be referred to herein by reference numeral 120 when collectively discussing groups of user devices 120. However, the techniques disclosed herein are equally applicable to a single user device or a plurality of user devices. Although indicated as separate in FIG. 1A, one of ordinary skill in the art will appreciate that some or all of the functionality described herein for a user device may be performed by a device other than a user device 120 in a user's possession. For example, a user may use a user device 120 to log into or otherwise interact with a remotely provided service (e.g., a web-based service) so that processing is performed on the remote server (on behalf of the user of the user device 120) in response to interactions with a web page or a graphical user interface (e.g., an HTML, form; an HTML interface, such an HTML5 interface; and an Angular.js interface). Among other things, such an interface could be used to provide, modify, and/or delete data of the user and to specify conditions for managing the user's data. As described in greater detail below with respect to a user device proxy, filtering rules also can be off-loaded from the user device 120.

When the at least one data aggregator system 100 "obtains" data from any one of the user devices 120, the at least one data aggregator system 100 may receive the data through any form of data transfer, including, but not limited to receiving the data using a wired communication (e.g., serial-based communication such as USB or Ethernet) or a wireless communication (e.g., using radio frequency (RF) communication (such as Wi-Fi (under any of the 802.11 families of standards), mesh, cellular, and/or wireless Local Area Network (WLAN) communication), infrared (IR) communication, or other light-based communication). Such transfers also include the copying of files from one or more storage media attached to the at least one data aggregator system 100 either physically (e.g., via a USB connection) or logically (e.g., using at least one file server). Such transfer also includes inter-process communications when an application of a user device 120 and the at least one data aggregator system 100 are running computer code on a single platform (e.g., when running in different virtual machines on a common set of hardware).

As discussed in greater detail below, as described herein, any of the data aggregator systems, user data devices, and data consumer devices can be implemented using special-purpose hardware on fixed or portable devices including (a) one or more computer processors with specially programmed computer instructions for controlling the one or more computer processors to perform one or more of the techniques described herein and/or (b) application specific hardware using binary logic to perform one or more of the techniques described herein.

When any of the devices 100, 120, and 140 obtain data from another one of those devices, they can do so by utilizing one or more different types of user interfaces, such as (1) a custom-built application for communicating with the device, (2) a web browser or cloud-based application that connects to or communicates with the device (or an agent of the device), or (3) an email interface or a social media interface that connects to or communicates with the device (or an agent of the device).

Similarly, when any one of the devices 100, 120, and 140 "transfers" data to any one of the other devices, the device may send the data through any form of data transfer, including, but not limited to sending the data using a wired communication (e.g., serial-based communication such as via a Universal Serial Bus (USB) or Ethernet) or a wireless communication (e.g., using radio frequency (RF) communication (such as Wi-Fi (under any of the 802.11 families of standards), mesh, cellular, and/or WLAN communication), IR communication, or other light-based communication). Such transfers also include the copying of files to one or more storage media attached to any one of the devices either physically (e.g., via a USB connection) or logically (e.g., using at least one file server including via a cloud-based connection). Such transfer also includes inter-process communications when the devices are running computer code on a single platform (e.g., when running in different virtual machines on a common set of hardware).

Figure 1B:
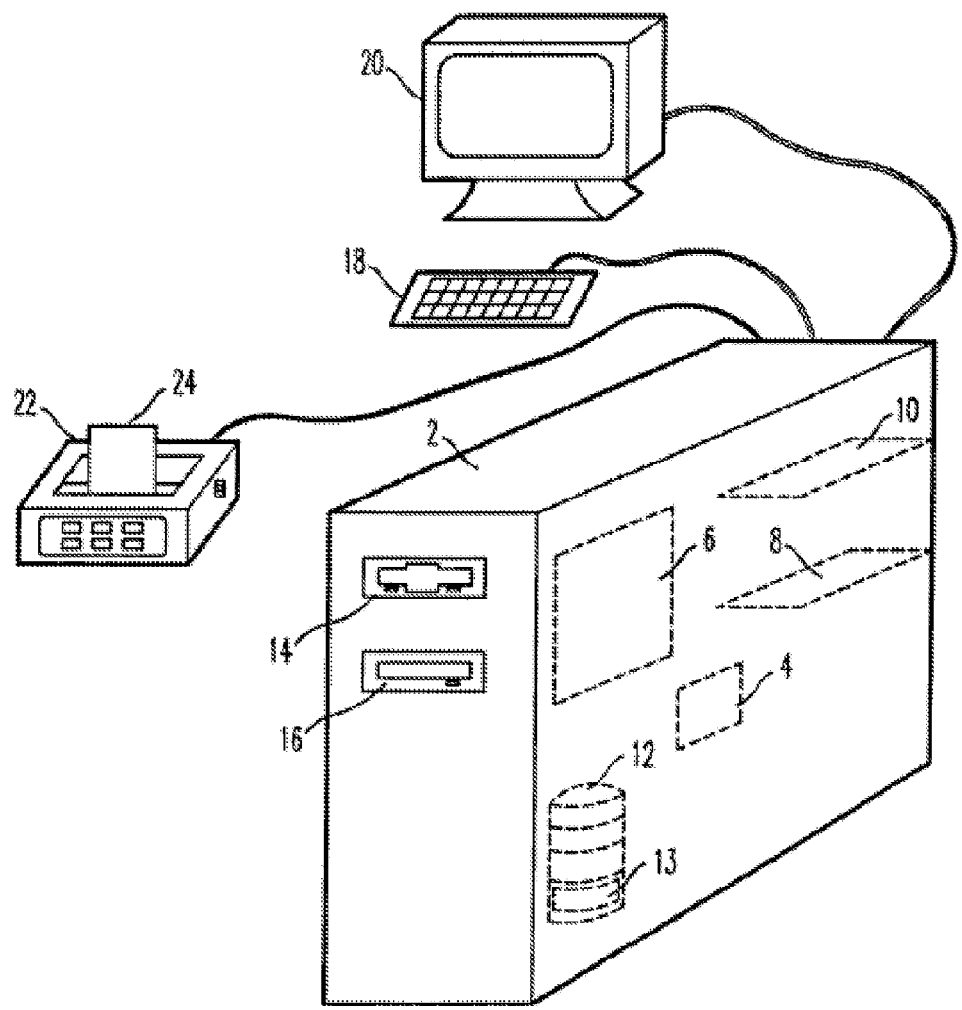
FIG. 1B is a diagram of an exemplary computer system for implementing at least one of: the user device, the data aggregator system and the data consumer device.
Figure 1C:
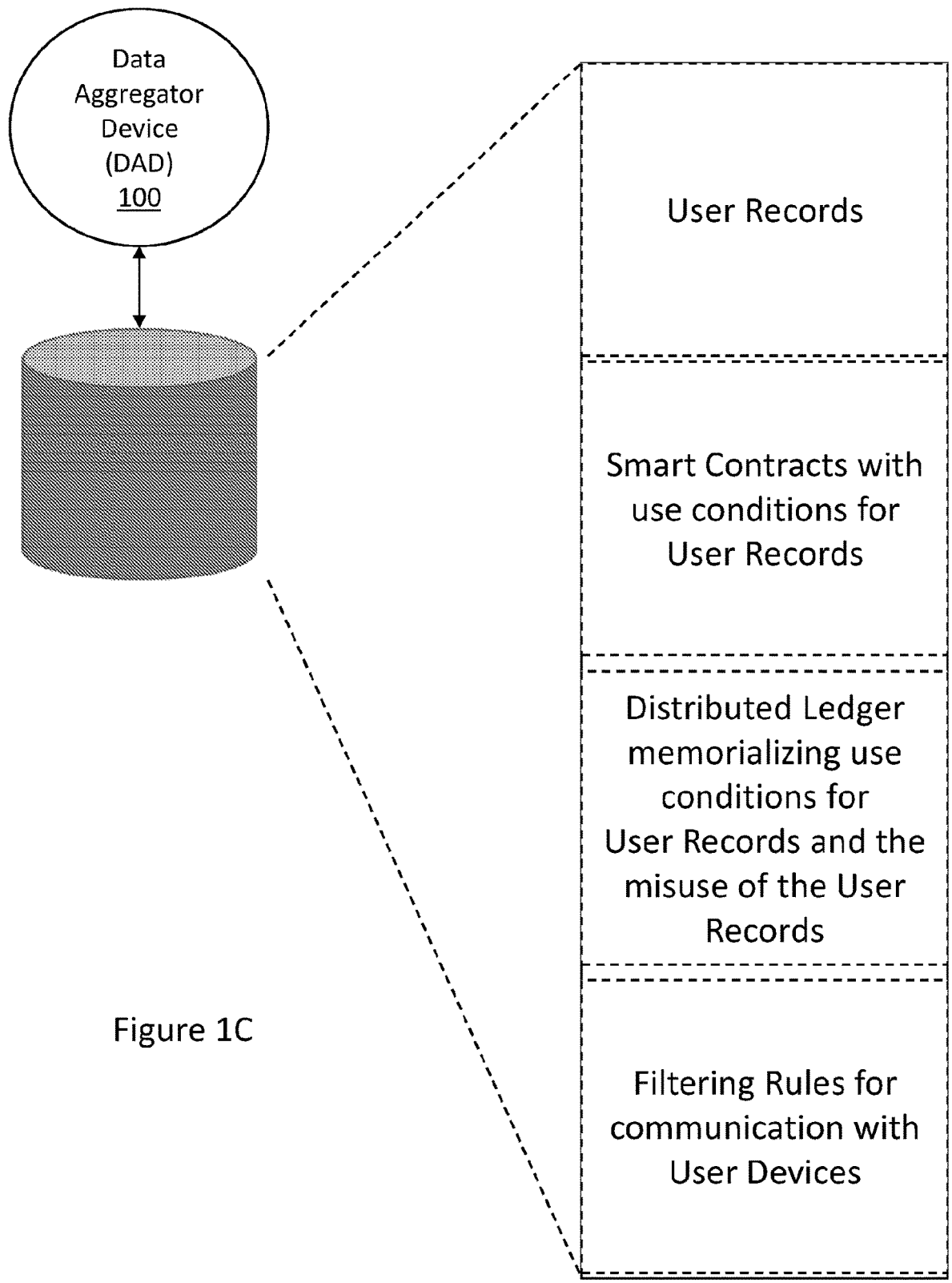
FIG. 1C is a block diagram of any one of (a) an exemplary data aggregator system, including computer storage for storing and providing at least one of user data records, smart contracts related to the use of user data records, a distributed ledger memorializing use conditions for user data records, and filtering rules for controlling/restricting communications between the data aggregator system and at least one user device; (b) an exemplary user device for providing data to at least one data aggregator system and receiving and responding to requests for additional data from the at least one data aggregator system; and (c) an exemplary data consumer device for requesting and receiving shared data of at least one user device via the at least one aggregator device.

Each data aggregator system 100 may receive and process requests from both user devices and data consumer devices from a number of application programming interfaces and user interfaces either serially or in parallel (e.g., using multiple physical and/or virtual communication connections). Such communication connections are preferably via at least one reliable communication service (e.g., TCP/IP or Reliable Datagram Protocol (RDP)) or over an unreliable communication service (e.g., UDP) on top of which are built application-specific retransmission and/or verification protocols. Above the reliable and/or unreliable communication services, the devices described herein may communicate using a variety of communication protocols (e.g., HTTP, secure HTTP (HTTPS), WebDAV) and/or the devices may communicate via specialized tunneling protocols (e.g., using a virtual private network (VPN)). As shown in FIG. 1, the number of data consumer devices 140A to 140Z may also be different than then number of either data aggregator systems 100 or user devices 120, or alternatively it may be the same as either or both.

As shown in FIG. 2, in an exemplary processing described for the sake of illustration, the at least one data aggregator system 100 obtains from a user device 120 a set of data that initially describes a user "User1." In order to entice the user to provide such data, a number of various incentives may be provided by the at least one data aggregator system 100 to the users of the user devices 120. Such incentives may include, but are not limited to: monetary currency, cryptocurrency, award travel points, store credit, and discounted or free services.

As illustrated, the data received is a typed data block in a notation similar to an XML, or JSON style format where the type of the data (or data key) surrounds the data itself, and attributes or metadata further describing the data follow the data type and precede the data itself. Collectively, the data type (or data key), the data itself, and the attributes (or metadata) are referred to as a data element. For example, the "user" data element begins and ends with the tags "<user>" and "</user>," respectively, to show where the information about a user begins and ends. As would be appreciated by those of skill in the art, the overall structure of the data elements may be recursive and can be described by an architecture specification (e.g., such as a Data Type Definition (DTD) file). Furthermore, the data types (or keys) and the data used herein are only for illustrative purposes; other keys could instead be used to signify the same type of data (e.g., "users" could be replaced with "people"). Moreover, although the description herein is primarily provided referencing "users," the system is not limited to aggregating data about only users. Other "entities" can similarly be tracked for similar purposes. For example, information on "devices" can be tracked to enable the services to be provided to the devices to be similarly customized.

As further shown in FIG. 2, the typed data block may further be segmented into various overlapping or non-overlapping data elements. A first illustrated data element includes one or more sub-data elements that all correspond to demographic information about a user. For example, a user device 120 may provide to the at least one data aggregator system 100 the corresponding user's name (e.g., "Name1") and information about the user (e.g., birthdate, height and eye color). As would be appreciated, more or less demographic information is provided in various embodiments of the information described herein without departing from the intent of this disclosure.

As also shown in FIG. 2, identifying information (in a data element having a data key called "identifyinginformation") may be provided in a separate data element and may include information designed to identify the user (e.g., a U.S. social security number (e.g., in the form xxx-yy-zzzz) or a driver's license number (such as may be issued by the State of California)). As shown, data elements may include overlapping information (e.g., the "name" data element) so that certain portions of the information can be separately provided in multiple contexts without having to share other information, especially where different groups of data elements are encrypted with different keys (as shown in FIG. 9). For example, data segmentation may occur when a user is willing to share demographic information with a data consumer device 140 but not identifying information or financial information, or when a user is willing to share financial information with a data consumer device 140 but not identifying or demographic information.

As shown in FIG. 3, the at least one data aggregator system 100 may aggregate information received from a number of users having corresponding user devices 120 (shown as "User1," "User2," and "User3") and (1) utilize the data elements of the received information as-is, (2) remove information from the data elements, and (3) supplement the information with additional data elements. In the illustrated typed data block, the at least one data aggregator system 100 aggregates "user" data elements as part of a nested "users" data element. Internally, the "identifyinginformation" data element is shown as having been stripped of information that the at least one data aggregator system 100 is not allowed to store (or elects not to store), such as social security numbers and drivers license numbers. However, the user data element is shown as being supplemented with an internally generated "userid" attribute (having an exemplary value of "1234") so that the shared data of the user corresponding to the respective user device can be monitored by the at least one data aggregator system 100. Attribute information likewise may be used to manage sharing of information with one or more data consumer devices when sharing other elements in the same data element. As illustrated, the "birthdate" data element has added to it a "nevershare" attribute that is set to "true" such that the birthdate information is never directly shared. In one embodiment, the user may nonetheless still elect to have age-related information provided by including an "age" data element that includes an "as-of" attribute so that the system can determine an approximate age using a current date and the attribute value (e.g., "2019-01-01" of the attribute).

The data element for the user is additionally supplemented with placeholders for other information that is to be associated with the user (e.g., "healthinformation" and "purchasinginformation") which are illustrated by using corresponding empty tags (e.g., "<healthinformation/>" and "<purchasinginformation/>"). Moreover, as will be described in greater detail below, the at least one data aggregator system 100 may add to the information about a user device 120 additional information relating to what information of the user's information has been shared with the different data consumer devices 140 (such as by storing such information in a data element called "usageinformation").

The data stored by the at least one data aggregator system 100 is stored in a manner so that it can be retrieved and managed as requested in order to respond to requests by user devices and/or data aggregator systems. In one such embodiment, the data is simply written to a file as a series of data records and/or data elements (e.g., as used in fixed-format file or a self-describing data file such as an XML-style file). In an alternate embodiment, the data is stored in at least one record in a database (or in plural databases that are local and/or remote) accessible either directly using by reading from/writing to the database or through a database manager (including a database manager that performs network accesses, including reads and writes, to at least one remote database). In another alternate embodiment, the data elements when stored by the at least one data aggregator system 100 are written (in encrypted form) to a distributed ledger (e.g., using a blockchain) to provide accountability of the data as received from the user device and/or as transferred to data consumer devices. In a further alternate embodiment, a cryptographic digest of the data (such as a hash) is written to a distributed ledger instead to provide accountability of the data as received from the user device and/or as transferred to data consumer devices. In yet another alternate embodiment, a record number or record pointer identifying a record in an off-ledger data storage (e.g., a database) is written to the distributed ledger to provide accountability of the data as received from the user device and/or as transferred to data consumer devices. As would be understood by those of ordinary skill in the art, different databases and/or distributed ledgers can be used to store different data (e.g., the user's data is stored on a local or remote database and the usage conditions for use of that data are stored on a distributed ledger).

Figure 4B:
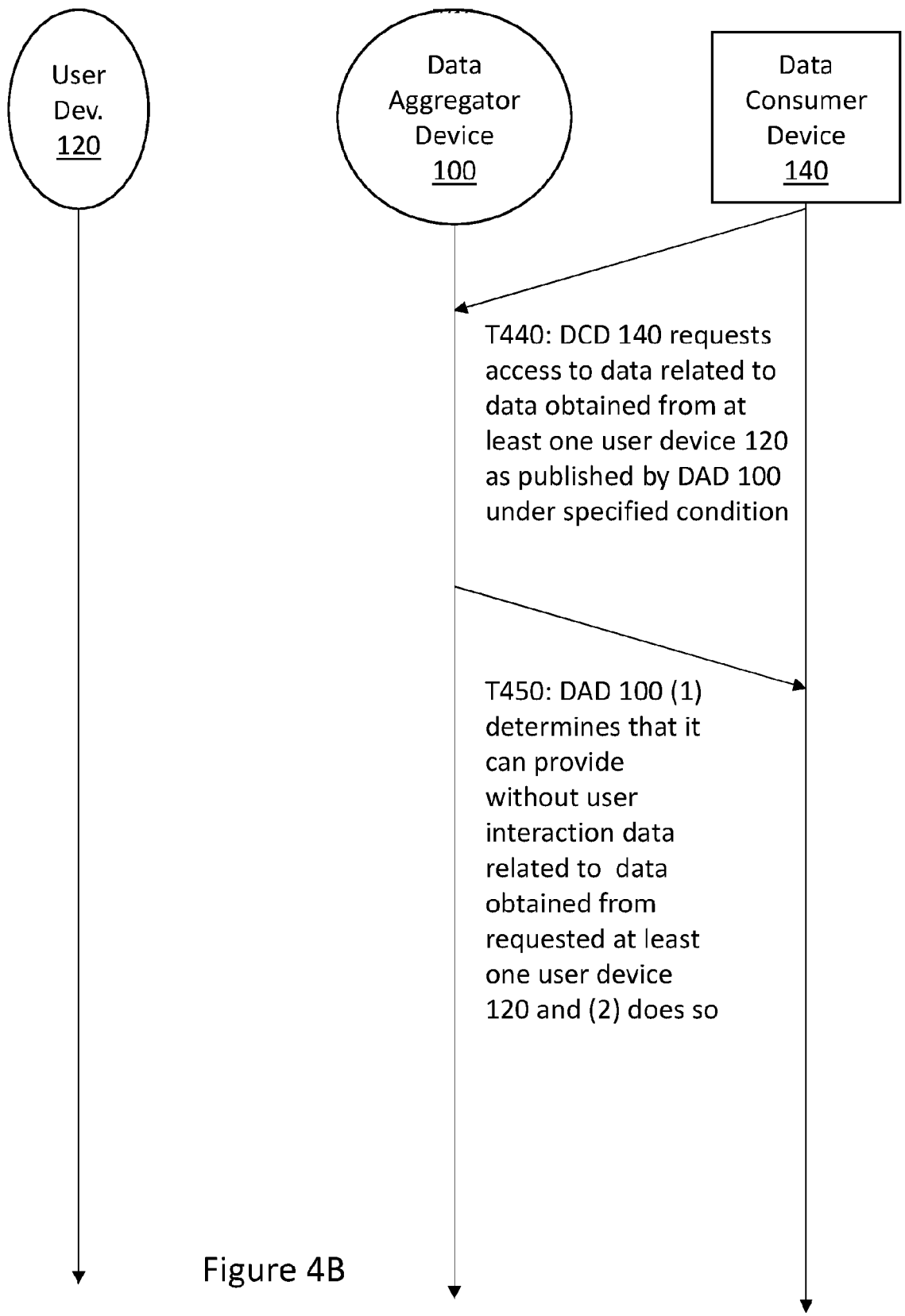
FIG. 4B is a first continuation of the data exchange diagram of FIG. 4A and shows a data consumer device requesting and being provided access to data related to data obtained from at least one user device as published by the at least one data aggregator system and which the at least one data aggregator system can supply without user intervention.

Turning to FIGS. 4A-4D, a series of data exchange diagrams show a number of the data transfers between the at least one data aggregator system 100, the user device(s) 120, and the data consumer device(s) 140. In FIG. 4A, the at least one data aggregator system 100 obtains (via transfer T400) data from at least one user device 120. After processing the obtained data as necessary (e.g., to convert from the data of FIG. 2 to the data of FIG. 3), the at least one data aggregator system 100 publishes (via one or more transfers T410) the availability of at least a portion of the obtained data. In one embodiment, the data is made available for querying by data consumer devices 140 that request access to the data (e.g., using an API). In such an embodiment, prior to one or more transfers T410 a request (not shown) is sent that queries the number of records meeting certain criteria that are held by the at least one data aggregator system 100. For example, as part of a market analysis for a new color of eye shadow, a data consumer device 140 requests the number of user data elements held by the at least one data aggregator system 100 that are for users with: ages over 20 years old, incomes over $40000 and that have blue eyes. In response to the request, the at least one data aggregator system 100 publishes to the data consumer device 140 (by responding to its query) the number of such records without divulging the records themselves that meet those criteria.

In an alternate embodiment, an anonymized and aggregated summary is published where it can be read by data consumer devices 140 (e.g., on a distributed ledger or blockchain) such that no separate query need be made directly to the at least one data aggregator system 100 (thereby reducing the messaging load on the at least one data aggregator system 100).

Having determined that there is data that is of interest to it, the data consumer device 140 can request access to the shared data that corresponds to its needs. As shown in FIG. 4A, using transfer T420, the data consumer device 140 requests access to data obtained from at least one user 120 as published by DA100 under acceptable conditions. For example, the data consumer device 140 can request records that correspond to condition "c1" which for illustrative purposes is a monetary incentive (e.g., $1 payment to a default account).

In embodiments using smart contracts, the transfer T420 further includes a smart contract description including code for implementing a smart contract and type fields indicating the conditions of use of the data that the data consumer device 140 is requesting so that an enforcement mechanism can be used with the data consumer device 140 if the data consumer device 140 has been found to be misusing the data it receives. As shown in FIG. 10, a smart contract memorializes the length of time that the data can be used (as specified in the "validuntilatleast" field) and an acknowledgment of what data fields the data consumer device 140 is going to be receiving. The smart contract further is illustrated as including payor and payee fields to automatically handle payment of a penalty to be incurred as well as an amount. The amount is illustrated as a one-time payment of $5000 to the data aggregator system's account. The contract code field includes the actual code (e.g., an interpreted script written in a language supported by the distributed ledger or blockchain) that is implemented by the distributed ledger or blockchain system when the data aggregator system or other "oracle" reports a data misuse. Although not illustrated, the smart contract may include multiple types of misuse, the conditions showing the misuse, and respective penalties for each of the types of abuse.

Returning to FIG. 4A, as part of transfer T430, the data consumer device 140 may receive one or more corresponding records (e.g., a record shown in FIG. 5 for User1) when corresponding shared data is available under the specified conditions (e.g., conditions c1). In order to control the cost, the data consumer device 140 may specify as part of its request T420 the maximum number of records that it wishes to receive as results (thereby limiting any number of factors such as a cost for data consumer device 140).

As part of the transfer T430, the at least one data aggregator system 100 will update the information corresponding to the users whose information was supplied. As seen in FIG. 6, the transferred information, and the conditions under which the information was transferred are added to User1's information. Although for illustrative purposes the data elements corresponding to the usage records are added directly (in the "usagerecords" data element) to the other data records of User1, in an alternate embodiment the usage records are stored separately (e.g., in a database of usage records so that they are more easily queried). Alternatively, the record of usage may be sent to the corresponding user devices for their storage so that the shared data can be removed from the data aggregator system upon request by the user devices without losing a record of what was stored and with whom it was shared. Alternatively, the data aggregator system may store a hash of the information or a signed hash of the information such that the user device can prove to the data aggregator system what information was previously shared without having to allow the data aggregator system to permanently store the shared data.

In embodiments using smart contracts, prior to transfer T430, one or more smart contracts for the shared data are written to a distributed ledger or blockchain to record the agreed upon conditions for the data sharing. Alternatively, prior to the transfer T430, the data aggregator system 100 sends a hash of the data to be transferred to the data consumer device 140 and requests a signed message back from the data consumer device 140 confirming the hash so that the data consumer device 140 cannot later repudiate the transfer.

FIG. 4B is a continuation of the data exchange diagram of FIG. 4A and shows a data consumer requesting and being provided access to data related to data obtained from at least one user 120 as published by the at least one data aggregator system 100. For example, in a transfer T440, the data consumer device 140 may request that the information associated with the at least one of the records returned as part of a previous transfer T430 (e.g., the record for userid="1234" that was returned a month previously) be supplemented with additional information on the education of the corresponding user to determine the number of years of education of the user after high school. In one such embodiment, prior to the at least one data aggregator system 100 communicating with the user, the at least one data aggregator system 100 attempts to utilize information that it already has about the user to avoid interrupting the user for the information. For example, a URL of where User1 stores its public social media can be used by the at least one data aggregator system 100 to determine that user1 attended a four-year college and earned an MBA. Thus, the at least one data aggregator system 100 can autonomously add the requested data element (<educationinformation> <postHSEducation>4+</postHSEducation></educationinformation>). As shown in FIG. 7, in addition to adding the education information to the user's record, a new usage record is added to the user's information showing that the education information was shared (also under condition "c1") in transfer T450. The ellipses of FIG. 7 indicate that the earlier usagerecord is omitted for clarity. Although the example utilizes condition "c1" for both examples, the transfer could instead have happened under any condition that was acceptable to the data consumer device 140 for which there was already an existing condition of the user that met the transfer criteria.

Alternatively, T450 may instead include a rejection of the request in transfer T440 when the corresponding information is known not to be available from the user. For example, if the transfer T440 had requested the birthdate of user1, the at least one data aggregator system 100 would have known that it was not possible to share that information from the "nevershare" attribute of the birthdate data element (shown in FIG. 3).

Figure 4C:
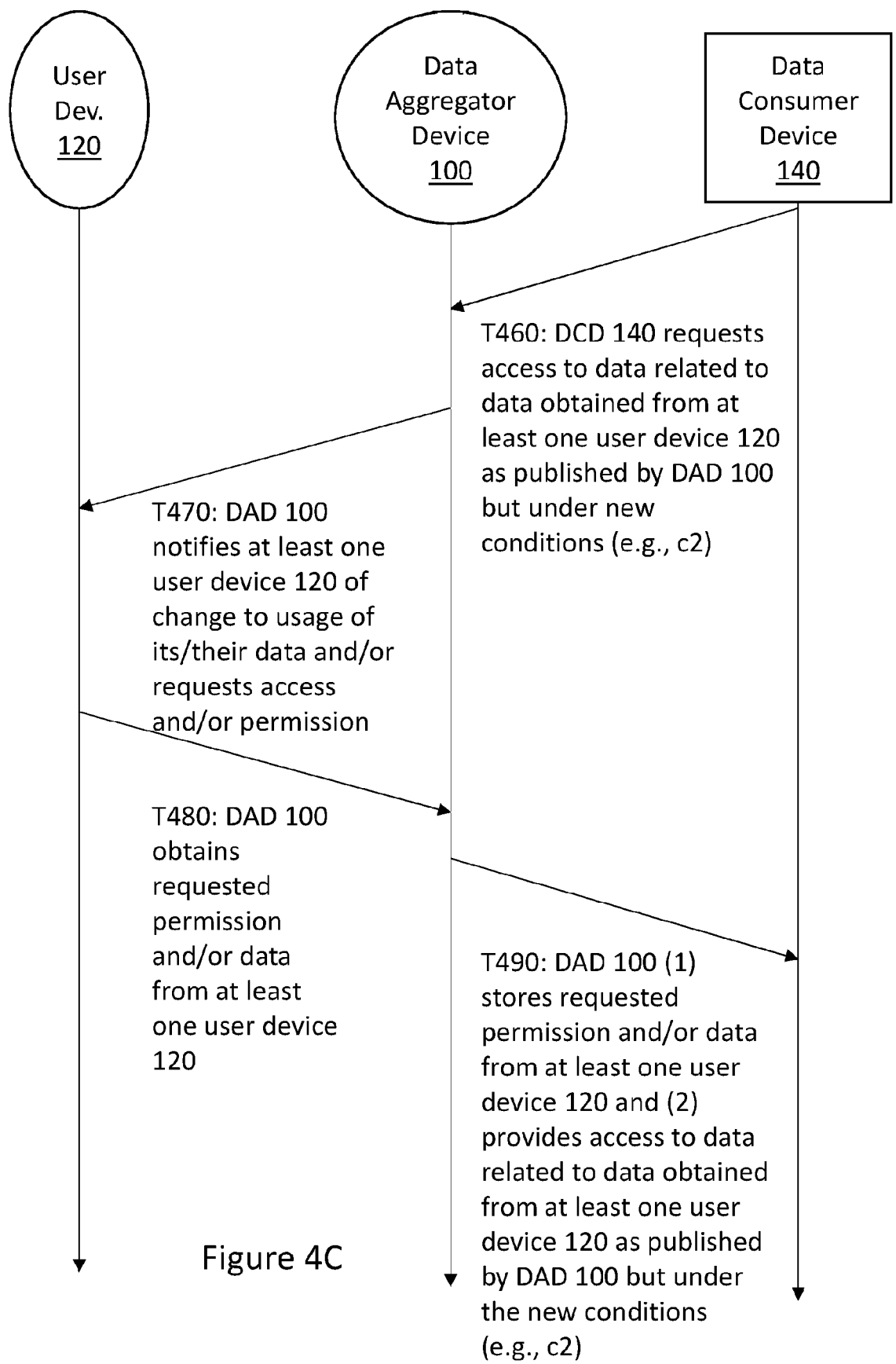
FIG. 4C is a second continuation of the data exchange diagram of FIG. 4A and shows a data consumer device requesting and being provided access to data related to data obtained from at least one user device as published by the at least one data aggregator system but under a new set of conditions "c2"

FIG. 4C is a continuation of the data exchange diagram of FIG. 4A and shows a data consumer device requesting and being provided access to data related to data obtained from at least one user device 120 as published by the at least one data aggregator system 100 but under a new set of conditions "c2". In FIG. 4C, in transfer T460, the data consumer device 140 requests either new data that is not already available (and which at least one data aggregator system 100 cannot obtain autonomously) or the use of data under a set of incentives/use parameters that have not previously been established. For example, the data consumer device 140 may request information on the user's hair color in addition to eye color as part of its eye shadow research. As such data was not previously available, the at least one data aggregator system 100 requests in transfer T470 that the hair color information be provided. Alternatively, the transfer T470 could have been requesting a set of new permissions such as the right to use existing data for a longer period than previously allowed or the right to redistribute the data. In either case, in transfer T480, the user device 120 indicates whether or not the updated conditions are acceptable and/or what the acceptable conditions are. Assuming that conditions "c2" are acceptable, in transfer T490 the at least one data aggregator system 100 (1) stores requested permission and/or data from at least one user device 120 and (2) provides access to data related to data obtained from at least one user device 120 as published by DA100 but under the new conditions (e.g., c2). As shown in FIG. 8, the data elements of the user are updated accordingly.

In an embodiment utilizing smart contracts, a smart contract can be included with the transfer T460 such that the data aggregator is bound by its proposed use of the data to be shared. As was discussed above with respect to FIG. 10, smart contract information can be added to a blockchain or distributed ledger as part of the process of sending the requested data. The conditions of the smart contract would then also be passed to the user device 120 as part of the transfer T470.

In the transfers of FIG. 4C, it is assumed that the data consumer device 140 provided a set of conditions that the user device 120 could accept by specifying the requested data and the conditions of use (e.g., an incentive amount and an expiration time). However, the transfer T460 could instead be in the form of a request for information or a change in permission and a solicitation of the permissions acceptable to the user. In such a configuration, there would be additional transfers required to conduct at least one offer/acceptance cycle for the conditions of the transfer. As such, the number of transfers may vary. In one embodiment, the user device 120 bids out the usage of its data before providing it. When contacted by the at least one data aggregator system 100 (e.g., by email, responding to an inquiry on a website or via an app), the user may indicate the conditions under which it will provide the information without first providing the information. For example, the condition c2 offered by the data consumer device 140 may have an open incentive term that the user has to respond with or the condition c2 may be countered by the user (e.g., by specifying a higher or different incentive) and the counter-offer is returned to the data consumer device 140. If the specified incentive term is acceptable to the data consumer device 140, then the user provides data via the aggregator device 100.

In such an embodiment, rather than accepting or rejecting the conditions specified by the data aggregator system in transfer T460, the user device 120 between transfers T470 and T480 may instead generate and send back to the data consumer device (via the data aggregator system 100) a counterproposal for the requested use, and in the case of embodiments using smart contracts, a new smart contract controlling the use under the counterproposal. As shown in FIG. 11, a counterproposal may include one or more sets of conditions that the data aggregator system can accept and that the user device is willing to be bound to. As shown in FIG. 11, although the counterproposal could include a single set of conditions, the illustrated counterproposal includes two different sets of conditions of different lengths of time for the data usage with two different penalties: (1) a one-time fee of $10,000 and (2) a monthly fee of $2000 for 12 months. Such conditions may be acceptable to a data aggregator system that knows that the data will not be misused such that the increased penalties will never need to be paid out. The proposal/counterproposal process can be repeated any number of times between transfers T470 and T480 until a mutually acceptable set of conditions is found or no agreement can be reached.

Figure 4D:
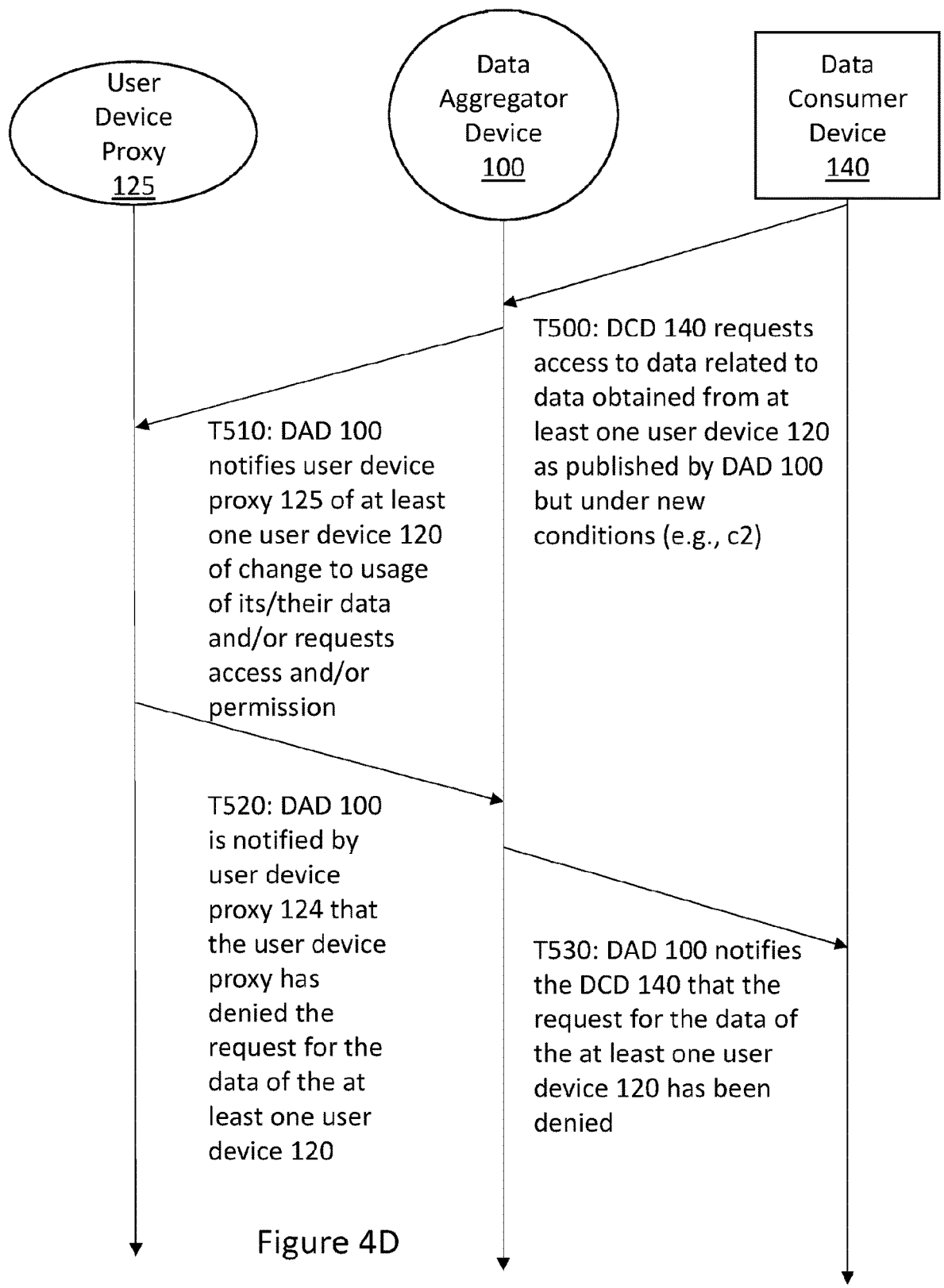
FIG. 4D is a third, alternate continuation of the data exchange diagram of FIG. 4A and shows a data consumer device requesting but being denied access via a user device proxy to the requested data under the new set of conditions "c2"

FIG. 4D is a third, alternate continuation of the data exchange diagram of FIG. 4A and shows a data consumer device requesting but being denied access, via a user device proxy, to the requested data under the new set of conditions "c2". In transfer T500, the data consumer device 140 requests access to data related to data obtained from at least one user device 120 as published by data aggregator system 100 but under new conditions (e.g., c2). In transfer T510, rather than contacting the user device 120 to obtain additional input from the user itself, the data aggregator system 100 notifies a user device proxy 125 of at least one user device 120 of a proposed change to usage of its/their data and/or requests access and/or permission to obtain or use other data. The user device proxy 125 then performs a series of checks (e.g., using a set of rules) to determine if it can determine whether (1) the request should be passed on to the user of the user device; (2) the request should be denied based on stored rules; or (3) the request should be countered with a pre-stored counterproposal or a dynamically generated counterproposal based on at least one rule. In one embodiment, the user device proxy 125 resides on the user device and is designed to reduce the number of interactions required with the user in light of requests from the data aggregator system 100. In an alternate embodiment, the user device proxy 125 resides on the data aggregator system (e.g., in a separate virtual machine) and is designed to reduce the number of interactions required with the user device while isolating/hiding the rules of the user from the data aggregator system 100 (e.g., to avoid a situation where the data aggregator system 100 can see the conditions by which the user data device would accept changes and/or provide additional data). In yet another embodiment, the user device proxy 125 runs as a set of filtering rules as part of the data aggregator system on behalf of the user device to reduce the overhead with proxy/data aggregator system interactions. Exemplary rules that can be used on behalf of a user include rules such as: (1) pass the request on to the user if the data consumer device is requesting <X> information; (2) pass the request on to the user if (2a) the data consumer device is requesting <Y> information, (2b) the request is coming from <Z> data consumer device, and (2c) the expiration of the use of the data is in the date range of <Date1>-<Date2>; and (3) otherwise block the request from being passed on to the user.

In transfer T520, the data aggregator system 100 is notified by the user device proxy 124 that the user device proxy 125 has denied the request for the data of the at least one user device 120 without the need for intervention by the user of the user device. In transfer T530, the data aggregator system 100 notifies the data consumer device 140 that the request for the data of the at least one user device 120 has been denied. Alternatively, as discussed above, the proxy can engage in one or more counterproposals with the data consumer device before a decision is made to accept or reject the conditions.

When storing information about what information of which user was transferred to which data consumer device 140, the system may require that transferred information (or a cryptographic digest of the transferred information) be stored on a distributed ledger or blockchain so that the data consumer device 140 cannot repudiate that it received the information and under the conditions that it negotiated. Alternatively, a data consumer device 140 may provide a signed message including a cryptographic digest of the transferred information.

Such authentication of the information is important if a data consumer device 140 is accused of data misuse. Indeed, in one exemplary embodiment, the transfers of information (e.g., in transfer T430, T450, and T490) may involve the automatic execution of a self-executing smart contract. In such a configuration, the account of a data consumer device 140 would automatically be debited to compensate a user when consensus is reached that the data consumer device 140 misused the user's data.

Furthermore, a distributed ledger (e.g., a blockchain) is utilized in one embodiment to track abuse by data aggregator systems. When a violation of the conditions of use are detected, one or more entries are added to the distributed ledger to track one or more of: (1) a type of abuse, (2) when the abuse occurred and/or was detected, (3) how the abuse occurred (e.g., what conditions of use were violated), (4) which data aggregator system is responsible for the abuse, (5) any penalty that was assessed for the abuse and whether the penalty is on-going, (6) what compensation was provided and whether the compensation is on-going, and (7) any other information about the abuse that may be important to other user devices, such as the characteristics of the query that resulted in abuse of a portion of the query results so that other user devices that were part of the same query results or part of other queries for the same type of data can be notified.

As would be appreciated by those of ordinary skill in the art, the distributed ledger can be used to store additional information as well. For example, in one embodiment, the same or a different distributed ledger is used to store preferences corresponding to at least one of the user devices 120.

Each of the at least one data aggregator system 100, the user device 120 and the data consumer device 140 is implemented in at least one embodiment as at least one computer system that includes at least one processor, at least one (non-transitory) computer memory for storing computer instructions to control the operation of the at least one processor, and at least one input/output interface for performing the communications described herein (e.g., the communications enabling the at least one data aggregator system 100 to obtain and transfer data as described herein). In one exemplary embodiment shown in FIG. 1B, a computer 2 includes, but is not limited to: at least one processor 4 communicating with at least one memory subsystem 6, at least one communications adapter 8, at least one input/output controller 10 (e.g., for communicating via universal serial bus (USB) communications), magnetic digital storage 12 (e.g., hard disk drives), semiconductor digital storage 13 (e.g., flash memory-based storage), low density removable medium storage (e.g., a floppy disk drive) 14 and high density removable medium storage means (e.g., Blu-ray, compact disc drive and/or tape drive) 16. Furthermore, keyboard 18 and monitor 20 are connected to the computer system 2 for respectively inputting interactions with and outputting resulting actions from the computer system 2. An additional printer 22 for printing reports 24 is also provided.

The processor can comprise commercially available processors (e.g., Intel 80×86, Motorola 680×0, Power PC, etc.) to direct and coordinate the activities of the other components of the computer system. The memory subsystem 6 comprises at least one of read only memory (ROM) and random access memory (RAM), and the memory's subsystem 6 stores instructions to be executed by the processor 4. Together the processor 4 and memory subsystem 6 control the other devices of the computer system and communication with other computer systems (e.g., communications between a user device 120 and the data aggregator system 100 and/or communications between the data aggregator system 100 and the data consumer device 140). Likewise, each of the at least one data aggregator system 100, the user device 120 and the data consumer device 140 can be implemented as a distributed system in which plural computer systems communicate to collectively provide the functions described herein. In one such embodiment, load balancing may be performed between the plural computer systems to provide reduced latency and/or increased throughput (e.g., by directing a data consumer device 140 and/or a user device 120 to a nearer or more powerful computer system that implements a portion of one of the at least one data aggregator systems 100. The plural computer systems may include at least one cloud-based implementation, including at least one cloud-based implementation that dynamically assigns and removes processors and other computer resources based on load.

Those of ordinary skill in the art will appreciate that at least one embodiment utilizes processors with plural processing cores and/or threads to enable parallel processing of the operations described herein that do not need to be serialized. In the case of operations that do need to be serialized, the computer system utilizes synchronization and/or serialization mechanisms (e.g., semaphores, locks, and/or schedulers) that are provided by the computer system for such purposes (e.g., as may be needed when two processes both wish to update the same portion of data simultaneously) but so as to provide increased concurrency.

In alternate embodiments of the at least one data aggregator system 100, the at least one data aggregator system 100 is implemented as a set of special-purpose processing circuitry (e.g., one or more of an application-specific integrated circuit (ASIC), a field programmable gate array (FPGA), a generic array of logic (GAL)) which may be non-programmable, one-time-programmable, or reprogrammable. Furthermore, in yet another embodiment, the at least one data aggregator system 100 is implemented as a combination of a computer system and a set of special-purpose circuitry to achieve the functionality described herein.

Furthermore, the communications described herein whereby data is obtained by and transferred from the at least one data aggregator system 100 may be performed using unencrypted or encrypted communication. In one embodiment using encrypted communication, the at least one data aggregator system 100, the user device 120 and/or the data consumer device 140, encrypt the data to be transferred before providing the pre-encrypted data to a corresponding communications interface (either physical or virtual (such as a socket)). In an alternate embodiment, the at least one data aggregator system 100, the user devices 120 and/or the data consumer device 140 provides the data to the corresponding communications interface in unencrypted form but requests that the corresponding communications interface encrypt the data prior to or as part of the transfer. In one embodiment, the at least one data aggregator system 100, the user devices 120 and/or the data consumer device 140 communicate using secure socket layer (SSL)-based communication such that the at least one data aggregator system 100, the user devices 120 and/or the data consumer device 140 do not separately have to handle communications.

While portions of the above description have described the data stored in the system as typed data blocks (which are stored in one or more data files, either in non-volatile storage (e.g., a hard drive) or volatile-storage (e.g., RAM)), in alternate embodiments, data is instead stored in one or more databases and accessed using direct database manipulation or through a database manager. In such a configuration the data is typically stored in data rows within data tables or in a corresponding object in the case of an object-oriented database.

As shown in FIG. 9, in one embodiment the user's confidential information is encrypted with one or more keys such that data can be segmented and controlled separately in encrypted form. The data elements identify a key number (but not a key value) of the key that was used to encrypt the various elements. In at least one embodiment, the user encrypts the data in a format specified by the at least one data aggregator system 100 before providing it to the at least one data aggregator system 100. In such a manner, the data can be transferred before the conditions are specified for the data's use without fear that the data will be improperly shared.

The invention claimed is:

1. An access control system comprising:
one or more processors; and
a computer memory, coupled to the one or more processors, for storing computer instructions, which, upon execution by the one or more processors, control the one or more processors to perform operations comprising:
obtaining a first set of data from a first user device, wherein the first set of data includes a first data value and a corresponding first tag indicating a data type of the first data value;
transferring the first data type of the first data value of the first set of data to a data consumer device;
obtaining, from the data consumer device, a first request for a second set of data from the first user device;
obtaining the second set of data, wherein the second set of data includes a second data value and a corresponding second tag indicating a data type of the second data value;
transferring the first set of data and the second set of data to the data consumer device for use under a first specified set of conditions, the first specified set of conditions including a penalty for violating the first specified set of conditions; and
in response to determining the data consumer device has violated the first specified set of conditions, applying the penalty to the data consumer device.

2. The system as claimed in claim 1, wherein the computer memory further comprises instructions which control the one or more computer processors to perform:
receiving a third set of data from the first user device, wherein the third set of data includes a third data value and a corresponding third tag indicating a data type of the third data value; and
storing the third set of data from the first user device with the first set of data and the second set sets of data.

3. The system as claimed in claim 2, wherein the computer memory further comprises instructions which control the one or more computer processors to perform the steps of:
encrypting the first set of data of the first user device using a first key specific to the first user device; and
encrypting the third set of data of the first user device using a second key specific to the first user device, wherein the first and second keys are different.

4. The system as claimed in claim 2, wherein the first set of data and the third set of data correspond to different fields of information.

5. The system as claimed in claim 4, wherein each of the first set of data and the third set of data correspond to a respective different field of information selected from the group of: personally identifiable information, financial information, medical information, travel information, purchasing information, residential information, and demographic information.

6. The system as claimed in claim 1, wherein the storing of the first set of data from the first user device comprises storing the first set of data from the first user device in a database.

7. The system as claimed in claim 1, wherein transferring the first set of data and the second set of data to the data consumer device for use under the first specified set of conditions comprises storing the first set of data and the second set of data of on a distributed ledger.

8. The system as claimed in claim 1, wherein transferring the first set of data and the second set of data to the data consumer device for use under the first specified set of conditions comprises storing on a distributed ledger a result of a cryptographic function performed on the first set of data and the second set of data.

9. The system as claimed in claim 1, wherein the computer memory further comprises instructions which control the one or more computer processors to perform:
sending to the first user device, in response to the obtaining from the data consumer device the first request for the second set of data, an electronic request for the second set of data.

10. The system as claimed in claim 9, wherein the electronic request comprises a smart contract for controlling use of the first set of data and the second set of data by the data consumer device, and
wherein the computer memory further comprises instructions which control the one or more computer processors to perform receiving an executed smart contract from the first user device in response to the smart contract sent in the electronic request.

11. The system as claimed in claim 1, wherein the obtaining the second set of data from the first user device comprises receiving a smart contract for the use of the first set of data and the second set of data.

12. The system as claimed in claim 9, wherein the electronic request comprises at least one of an email, a web-based notification and an app-based notification.

13. The system as claimed in claim 1, wherein the computer memory further comprises instructions which control the one or more computer processors to perform:
   providing to the first user device an incentive for the use of the first set of data and the second set of data under the first specified set of conditions, the incentive comprising at least one of: monetary currency, cryptocurrency, award travel points, and store credit.

14. The system as claimed in claim 1, wherein the computer memory further comprises instructions which control the one or more computer processors to perform:
   receiving a notification of an alleged breach of use of the first set of data and the second set of data under the first specified set of condition;
   correlating the alleged breach of use of the first set of data and the second set of data under the first specified set of conditions with other reported alleged breaches of other sets of data of users other than the first user device; and
   determining, in response to the correlating, that the data consumer device is a participant in at least one of a threshold number and a threshold percentage of devices for which there is an alleged breach of use under the first specified set of conditions.

15. The system as claimed in claim 1, wherein transferring the first set of data and the second set of data to the data consumer device for use under a specified set of conditions comprises executing a smart contract between the first user device and the data consumer device utilizing the specified set of conditions.

16. The system as claimed in claim 1, wherein transferring the first set of data and the second set of data to the data consumer device for use under the first specified set of conditions comprises temporarily decrypting the first set of data and the second set of data internal to a server; and
   transferring the first set of data and the second set of data to the data consumer device over an encrypted communications channel.

17. The system as claimed in claim 1, wherein transferring the first set of data and the second set of data to the data consumer device for use under a specified set of conditions comprises performing a cryptographic function on the first set of data and the second set of data; and
   storing on a distributed ledger a result of the cryptographic function.

18. The system as claimed in claim 1, wherein the computer memory further comprises instructions which control the one or more computer processors to perform:
   obtaining a third set of data from a second user, wherein the third set of data includes a third data value and a corresponding third tag indicating a data type of the third data value;
   obtaining, from the data consumer device, a first request for a fourth set of data from the second user;
   obtaining the fourth set of data; and
   transferring the third set of data and the fourth sets set of data to the data consumer device for use under a second specified set of conditions.

19. An access control method comprising:
   obtaining a first set of data from a first user device, wherein the first set of data includes a first data value and a first tag indicating a data type of the first data value;
   transferring the first data type of the first data value of the first set of data to a data consumer device;
   obtaining, from the data consumer device, a first request for a second set of data from the first user device;
   obtaining the second set of data, wherein the second set of data includes a second data value and a corresponding second tag indicating a data type of the second data value; and
   transferring the first set of data and the second set of data to the data consumer device for use under a first specified set of conditions, the first specified set of conditions including a penalty for violating the first specified set of conditions; and
   in response to determining the data consumer device has violated the first specified set of conditions, applying the penalty to the data consumer device.

20. A non-transitory computer readable medium storing computer instructions, which, upon execution by one or more processors, control the one or more processors to perform a method comprising:
   obtaining a first set of data from a first user device, wherein the first set of data includes a first data value and a corresponding first tag indicating a data type of the first data value;
   transferring the first data type of the first data value of the first set of data to a data consumer device;
   obtaining, from the data consumer device, a first request for a second set of data from the first user device;
   obtaining the second set of data, wherein the second set of data includes a second data value and a corresponding second tag indicating a data type of the second data value; and
   transferring the first set of data and the second set of data to the data consumer device for use under a first specified set of conditions, the first specified set of conditions including a penalty for violating the first specified set of conditions; and
   in response to determining the data consumer device has violated the first specified set of conditions, applying the penalty to the data consumer device.

* * * * *